UNITED STATES PATENT OFFICE.

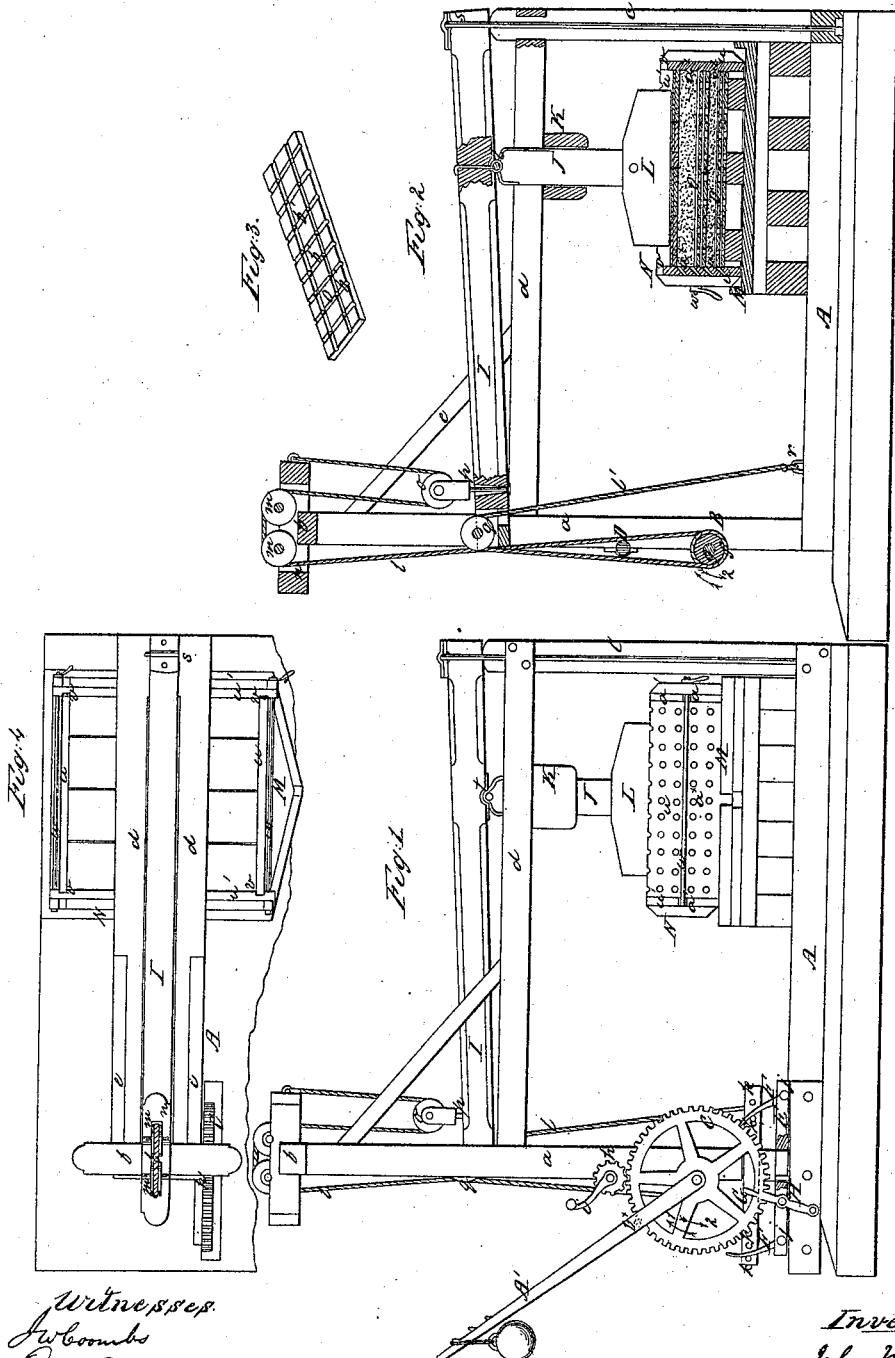

JOHN MANROW, OF SACRAMENTO, CALIFORNIA.

IMPROVEMENT IN FRUIT-PRESSES.

Specification forming part of Letters Patent No. 40,762, dated December 1, 1863.

*To all whom it may concern:*

Be it known that I, JOHN MANROW, of Sacramento, in the county of Sacramento and State of California, have invented a new and improved press, designed more particularly for expressing juice from fruit; and I do hereby declare that the following is a full, clear, and exact description of the same, reference being had to the accompanying drawings, making a part of this specification, in which—

Figure 1 is a side view of my invention; Fig. 2, a side sectional view of the same, the line of section passing through the center; Fig. 3, a detached perspective view of a perforated board pertaining to the same; Fig. 4, a plan or top view of the invention.

Similar letters of reference indicate corresponding parts in the several figures.

This invention relates to a new and improved press, which is more especially designed for expressing juice from grapes and other fruit, for the manufacture of wines, &c.

The object of the invention is to obtain a simple, portable, and economical press for the purpose specified, and one that may be operated with facility and perform its work expeditiously and thoroughly.

To this end the invention consists in a novel arrangement and application of a windlass and other parts, hereinafter described, for operating the follower of the press, and a novel arrangement of pawls for holding the windlass, and consequently the follower, at any desired point.

The invention further consists in a novel construction of the curb in which the fruit is pressed, and also in the employment or use of perforated boards placed within the curb and arranged so as to admit of a free escape of the juice from the fruit under pressure.

To enable those skilled in the art to fully understand and construct my invention, I will proceed to describe it.

A represents the base-plate of the press, which has two uprights, $a\ a$, at one end, connected at the top by a cross-bar $b$, the base-plate having an upright, $c$, at its opposite end, which supports two horizontal parallel bars, $d\ d$, at one end, the opposite ends of the latter being framed into the uprights $a\ a$, the uprights $a$ and horizontal bars $d$ being braced by bars $e\ e$.

The above parts constitute the frame of the press.

To the lower parts of the uprights $a\ a$ there is attached a windlass, B, which is formed of a drum, $f$, placed on a suitable shaft, $g$, having a toothed wheel, C, upon it, into which a pinion, $h$, gears, said pinion being on a shaft, D, having a crank, $i$, at one end.

E represents a slide-bar which is at one side of the base-plate A, underneath the wheel C of the windlass. This slide-bar has two pawls, F F, attached to it, one near each end. These pawls are attached to the slide-bar E by pivots $j$, and extend upward between pins $k\ k$, which are near the ends of a horizontal bar, G, attached to one of the uprights $a$. The slide-bar E is operated by a lever, H, and by being moved either pawl may be made to engage with the wheel C, so that the latter may be prevented from turning in either direction, as may be desired.

To the drum $f$ of the windlass B there are attached two ropes, $l\ l'$, which wind upon the drum and unwind from it at opposite sides, so that as one rope is wound upon the drum the other is unwound, and vice versa. The rope $l$ passes over two fixed pulleys, $m\ m$, in a horizontal bar, $n$, in the cross-bar $b$ at the top of the uprights $a\ a$, and passes underneath a pulley, $o$, which is connected by a swivel, $p$, with the outer part of a lever, I, the end of the rope $l$ being attached to the inner end of the cross-bar $b$. (See more particularly Figs. 1 and 2.) The rope $l'$ passes over a pulley, $q$, in the outer part of the lever I, and, extending downward, is attached to the base-plate A, as shown at $r$. The lever I has its fulcrum on the upper end of the upright $c$, on which it is retained by a metal strap or rod, $s$, which extends over the top of the lever, and to the lever I the upper end of a vertical slide-bar, J, is attached by a joint, $t$. The slide-bar J, is fitted within a socket, K, which is attached to the bars $d\ d$, and to the lower end of the bar J a follower, L, is secured.

M is a basin or juice-receiver, which is placed on the base-plate A directly below the follower L.

N is a curb, which is fitted or placed in the basin or receiver M. This curb is formed of four sides, $u\ u\ u'\ u'$, the sides $u'\ u'$ being grooved near their ends, as shown at $v$, to receive the ends of the sides $u$ $u$, and all the sides being secured in contact with each other by screw-rods $w$, which are fitted in notches $a'$ in the ends of the sides $u'$. All the sides of the curb are perforated with oblique conical holes $a^\times$, (shown clearly in Fig. 2,) and within the curb there are placed boards O, perforated with conical holes, and grooved so as to form channels $b'$ between the perforations, as shown clearly in Fig. 3. The boards O are placed side by side in the curb N, so as to form layers arranged in pairs, one over the other, as shown in Fig. 2, and one or more pairs being within the mass of fruit to be compressed. These perforated boards form a communication between the interior of the mass of fruit and the sides of the curb, and when the fruit is subjected to pressure the juice has a free escape, passing along the channels $b'$, from the interior of the mass of fruit to the sides $u$ $u$ $u'$ $u'$ of the curb, and through the oblique perforations $a^\times$ therein down into the basin or receiver M, from which it escapes into any proper receptacle prepared for it. The pressure is given the fruit by actuating the lever I, through the medium of the windlass B. When the drum $f$ is turned in the direction indicated by the arrow 1, the rope $l'$ is wound upon the drum and the lever I brought down, the rope $l$ unwinding at the same time, in order to admit of the descent of lever I. When the drum is turned in the opposite direction, as indicated by the arrow 2, the follower L is raised, the rope $l$ being wound upon the drum and the rope $l'$ unwound from it.

In order to relieve the slide-bar J of all unnecessary friction, it will be seen that the lever I acts vertically upon it, as said lever, as it descends, is allowed to slip or turn on the upper end of the upright $c$, the strap or rod $s$ retaining the lever in proper working position. This slipping or turning of the lever I on the upright $c$, in connection with the joint $t$, compensates for the curvilinear movement of the lever, and admits of the follower L rising and falling without causing undue friction. In cases where a continuous pressure is required, a lever, A, may be applied to the wheel C, and a weight applied to the lever. This lever has a hole made in one end of it to fit on the end of shaft $g$, and a pin, $b^\times$, is attached to the lever to fit between the teeth of the wheel.

By having the sides of the curb secured together, as shown—to wit, by the screw-rods $w$—the curb may be readily taken apart for the easy removal of the pomace and the thorough cleansing of the curb.

Having thus described my invention, what I claim as new, and desire to secure by Letters Patent, is—

1. The windlass B, provided with the two ropes $l$ $l'$, in connection with the lever I, having the follower-rod or slide-bar J attached by a joint, $t$, and secured on its fulcrum by a strap or rod, $s$, all being arranged to operate in the manner and for the purpose herein set forth.

2. The curb N, constructed of four sides, $u$ $u$ $u'$ $u'$, perforated with oblique holes, as shown, in connection with the perforated boards O, provided with channels $b'$, all arranged to operate as specified.

3. The slide-bar E, provided with the two pawls F F, which are fitted between stationary pins $k$ $k$, and arranged in such relation with the toothed wheel C of the windlass to operate as described.

4. The combination of the windlass B, ropes $l$ $l'$, lever I, arranged as shown, and with follower or slide-bar J attached as described, the curb N, with perforated sides, and the perforated boards O, and with or without the loaded or weighted lever A', all arranged to operate as herein described.

JOHN MANROW.

Witnesses:
ELI MAYO,
JOHN DENN.